(12) United States Patent
MacArthur et al.

(10) Patent No.: US 10,626,006 B2
(45) Date of Patent: Apr. 21, 2020

(54) FLUID FILL TOOL AND METHODS OF USING THE SAME

(71) Applicant: Honda Motor Co., Ltd., Tokyo (JP)

(72) Inventors: Benjamin B. MacArthur, Barrie (CA); Jonathan Bunting, Uxbridge (CA); Chris Lamantia, Utopia (CA)

(73) Assignee: Honda Motor Co., Ltd., Tokyo (JP)

( * ) Notice: Subject to any disclaimer, the term of this patent is extended or adjusted under 35 U.S.C. 154(b) by 229 days.

(21) Appl. No.: 15/626,368

(22) Filed: Jun. 19, 2017

(65) Prior Publication Data
US 2018/0362327 A1 Dec. 20, 2018

(51) Int. Cl.
| | |
|---|---|
| *B67D 7/02* | (2010.01) |
| *B67D 7/42* | (2010.01) |
| *B67D 7/44* | (2010.01) |
| *B67D 7/50* | (2010.01) |
| *B60T 17/06* | (2006.01) |
| *B60T 17/22* | (2006.01) |

(52) U.S. Cl.
CPC .......... *B67D 7/42* (2013.01); *B67D 7/02* (2013.01); *B67D 7/0294* (2013.01); *B67D 7/421* (2013.01); *B67D 7/44* (2013.01); *B60T 17/06* (2013.01); *B60T 17/222* (2013.01); *B67D 7/50* (2013.01)

(58) Field of Classification Search
CPC .......... B67D 7/42; B67D 7/02; B67D 7/0294; B67D 7/421; B67D 7/44; B67D 7/50; B60T 17/06; B60T 17/222
USPC .............. 141/96, 373, 383, 385, 387, 392
See application file for complete search history.

(56) References Cited

U.S. PATENT DOCUMENTS

| | | | |
|---|---|---|---|
| 1,457,535 A * | 6/1923 | McCune | B67D 7/42 141/312 |
| 4,959,960 A | 10/1990 | Lafountain | |
| 5,060,703 A | 10/1991 | Koerner | |
| 5,934,509 A * | 8/1999 | Niss | A21C 15/005 222/83 |
| 6,206,055 B1 | 3/2001 | Hollub et al. | |

(Continued)

FOREIGN PATENT DOCUMENTS

| | | |
|---|---|---|
| CN | 203715257 U | 7/2014 |
| CN | 104261338 A | 1/2015 |

(Continued)

OTHER PUBLICATIONS

"Filling Adapters", Production Information Sheet, Durr Somac Gmbh, Stollberg, Germany, available at http://www.somac-filling.de/en/Filling_Eguipment/Filling_Adapter 1065.html, last visited Jun. 13, 2017.

(Continued)

*Primary Examiner* — Matthew W Jellett
(74) *Attorney, Agent, or Firm* — Armstrong Teasdale LLP (57) ABSTRACT

A fluid fill tool for filling a reservoir on a vehicle includes a main body defining a cavity therein and a housing coupled to the main body and defining an opening therethrough. The housing is coupled to the main body such that the cavity is in flow communication with the opening. The fluid fill tool further includes a support mechanism coupled to the housing. The support mechanism is selectively moveable between a first position and a second position such that the support mechanism is configured to contact a wall of the vehicle to reduce movement of the reservoir.

20 Claims, 7 Drawing Sheets

(56) References Cited

U.S. PATENT DOCUMENTS

| | | | |
|---|---|---|---|
| 6,302,167 B1 | 10/2001 | Hollub | |
| 6,343,630 B1 * | 2/2002 | Dubinsky | F16L 37/0848 |
| | | | 137/614.05 |
| 6,799,614 B1 * | 10/2004 | Smith | B67D 7/42 |
| | | | 141/287 |
| 7,451,994 B2 * | 11/2008 | Heitner | B62H 1/10 |
| | | | 280/288.4 |
| 8,936,053 B2 | 1/2015 | Ogerly et al. | |
| 2004/0146408 A1 * | 7/2004 | Anderson | F04B 17/006 |
| | | | 417/63 |
| 2010/0200609 A1 | 8/2010 | Cadigan | |
| 2016/0039548 A1 | 2/2016 | MacArthur et al. | |

FOREIGN PATENT DOCUMENTS

| | | |
|---|---|---|
| CN | 205328598 U | 6/2016 |
| JP | 2007145384 A | 6/2007 |
| WO | 2016102710 A1 | 6/2016 |

OTHER PUBLICATIONS

"Fill Tool Series 114 for Brake System Filling", Production Information Sheet, Production Control Units, Inc., Dayton, OH, available at http://www.pcuinc.com/series-114-fill-tool, last visited Jun. 13, 2017.

"DataFill Brake Fill", Production Information Sheet, Serv-I-Quip, Inc., Downingtown, PA, available at http://www.siqinc.com/uploads/DataFill_Brake.pdf, last visited Jun. 13, 2017.

* cited by examiner

FLUID FILL TOOL AND METHODS OF USING THE SAME

BACKGROUND

The field of the present disclosure relates generally to a clamping and filling tool, and more particularly to a brake fluid clamping and filling tool for a vehicle.

During the manufacturing of vehicles, many fluids must be added to the vehicle before the vehicle can be safely operated. For example, separate fluids must be added to the vehicle engine, transmission, steering system, cooling system, and braking system. These fluids could include engine oil, transmission fluid, power steering fluid, antifreeze solution, and brake fluid. In some known systems, such fluids are stored in tanks along an assembly line and channeled through long tubes to a fill tool, which discharges the fluid into a reservoir in the vehicle.

However, advantages of using at least some known fluid fill systems may be limited. For example, at least some known fluid fill systems include sensors in the tubes near the storage tanks that monitor the pressure of the fluid within. However, the fluid may travel a significant distance from the storage tank before being channeled into the vehicle and the pressure of the fluid may decrease significantly over that distance. Also, known fluid fill tools are clamped onto an opening of a vehicle reservoir to prevent leaks and/or spills during the filling process. However, the vehicle reservoir may be made of a material, and/or secured within the vehicle, in a manner advantageous to operation of the vehicle, but not in a manner that facilitates supporting the weight of the fluid fill tool. Accordingly, when at least some known fluid fill tools are subjected to forces in certain directions, the seal between the fluid fill tool and the vehicle reservoir may break and allow leakage of the fluid may occur. Additionally, at least some known fluid fill tools include fluid valves that are permanently fixed in a certain orientation such that ownership of multiple tools with similar functions is required to account for variations in valve orientation.

BRIEF DESCRIPTION

In one aspect, a fluid fill tool for filling a reservoir on a vehicle is provided. The fluid fill tool includes a main body defining a cavity therein and a housing coupled to the main body and defining an opening therethrough. The housing is coupled to the main body such that the cavity is in flow communication with the opening. The fluid fill tool further includes a support mechanism coupled to the housing. The support mechanism is selectively moveable between a first position and a second position such that the support mechanism is configured to contact a wall of the vehicle to reduce movement of the reservoir.

In another aspect, a method of using a fluid fill tool to fill a vehicle reservoir with a fluid is provided. The method includes providing a main body including a fluid cavity defined therein and coupling a housing to the main body such that an opening defined by the housing is in flow communication with fluid cavity. The method also includes coupling a support mechanism to the housing and selectively moving the support mechanism between a first position and a second position to selectively contact a wall of the vehicle. The support mechanism is coupled to the housing and is spaced away from the wall in the first position and contacts the wall in the second position.

In yet another aspect, a fluid fill tool for filling a reservoir on a vehicle is provided. The fluid fill tool includes a main body including a first connector, a second connector, and a fluid cavity coupled in flow communication with both the first connector and the second connector. The fluid fill tool also includes a valve assembly coupled to the main body. The valve assembly includes a plurality of fluid lines. The valve assembly is selectively coupled to one of the first connector or the second connector to couple the fluid lines in flow communication with the fluid cavity through the first connector or the second connector.

In yet another aspect, a method of using a fluid fill tool to fill a vehicle reservoir with a fluid is provided. The method includes providing a main body including a first connector, a second connector, and a fluid cavity coupled in flow communication with both the first connector and the second connector. The method also includes selectively coupling a valve assembly to one of the first connector or the second connector and channeling the fluid through at least one of a plurality of fluid lines of the valve assembly. The method further includes channeling the fluid through the selected first connector or second connector into the fluid cavity and channeling the fluid from the fluid cavity into the vehicle reservoir.

DETAILED DESCRIPTION

It should be understood that the descriptions and drawings herein are merely illustrative and that various modifications and changes can be made in the structures disclosed without departing from the present disclosure. It will also be appreciated that various identified components of the fluid fill tool disclosed herein are merely terms of art and may vary from one manufacturer to another and should not be deemed to limit the present disclosure. All references to direction and position, unless otherwise indicated, refer to the orientation of the fluid fill tool illustrated in the drawings and should not be construed as limiting the claims appended hereto. Like numerals refer to like parts throughout the several views.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for filling a vehicle component with fluid are provided. It should be noted that although the various embodiments are described in connection with the automotive industry, such as for an automobile assembly process, one or more embodiments may be implemented in different industries and for different applications.

The embodiments described herein relate generally to a fluid fill system. More specifically, the fluid fill system described herein uses a fluid fill tool to channel a fluid into a reservoir on a vehicle. Previously, fluid fill systems are clamped onto an opening of a vehicle reservoir during the filling process. However, for various reasons, the vehicle reservoir may not support the weight of the fluid fill tool and leakage may occur. Accordingly, the fluid fill tool described herein includes a support mechanism that is moveable to selectively move the tool in position against a wall of the vehicle to restrict movement of the reservoir and the fluid fill tool. More specifically, the support mechanism locks the fluid fill tool to the vehicle body and provides an anchor point to balance the weight of the fluid fill tool to prevent or reduces movement of the fluid fill tool while the reservoir is being filled.

Figure 1:
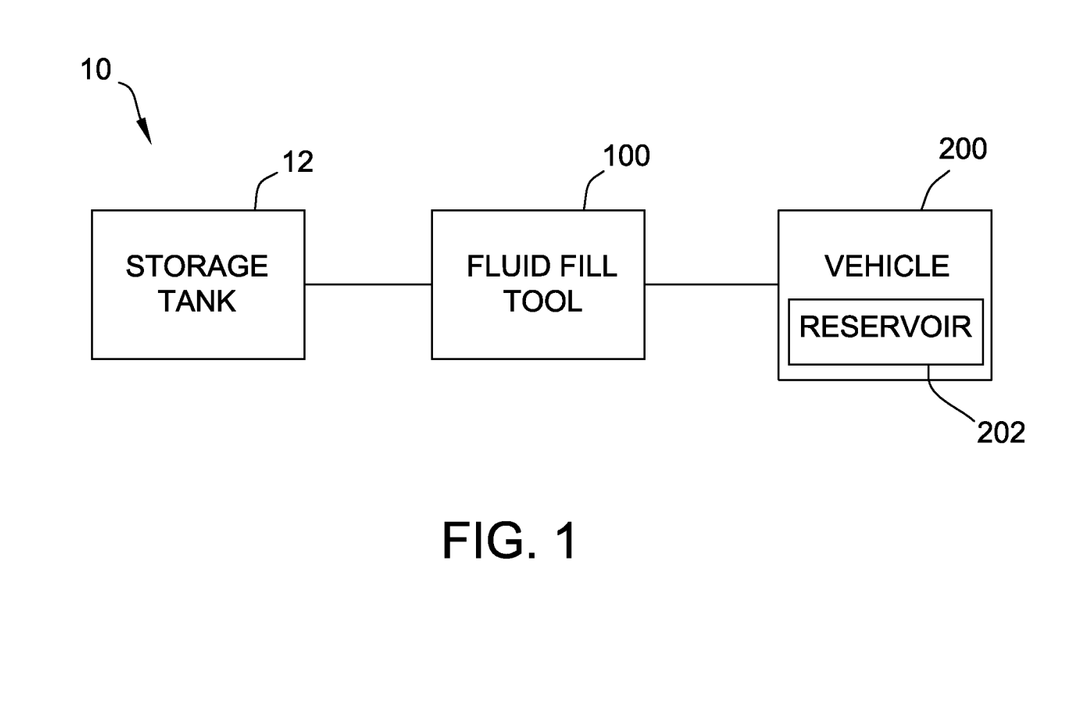
FIG. 1 is a schematic diagram of an exemplary fluid fill system.

FIG. 1 is a fluid fill system 10 including a fluid storage tank 12, a fluid fill tool 100, and a vehicle 200. In the exemplary embodiment, fluid fill system 10 channels fluid from storage tank 12, through fluid fill tool 100, and into a reservoir 202 of vehicle 200. In the exemplary embodiment, fluid fill system 10 channels brake fluid through fluid fill tool 100 and into brake fluid reservoir 202. Alternatively, in other embodiments, fluid fill system 10 may channel any other fluid, such as, but not limited to, include engine oil, transmission fluid, power steering fluid, antifreeze solution, and brake fluid to fluid reservoir 202 of vehicle 200.

Figure 2:
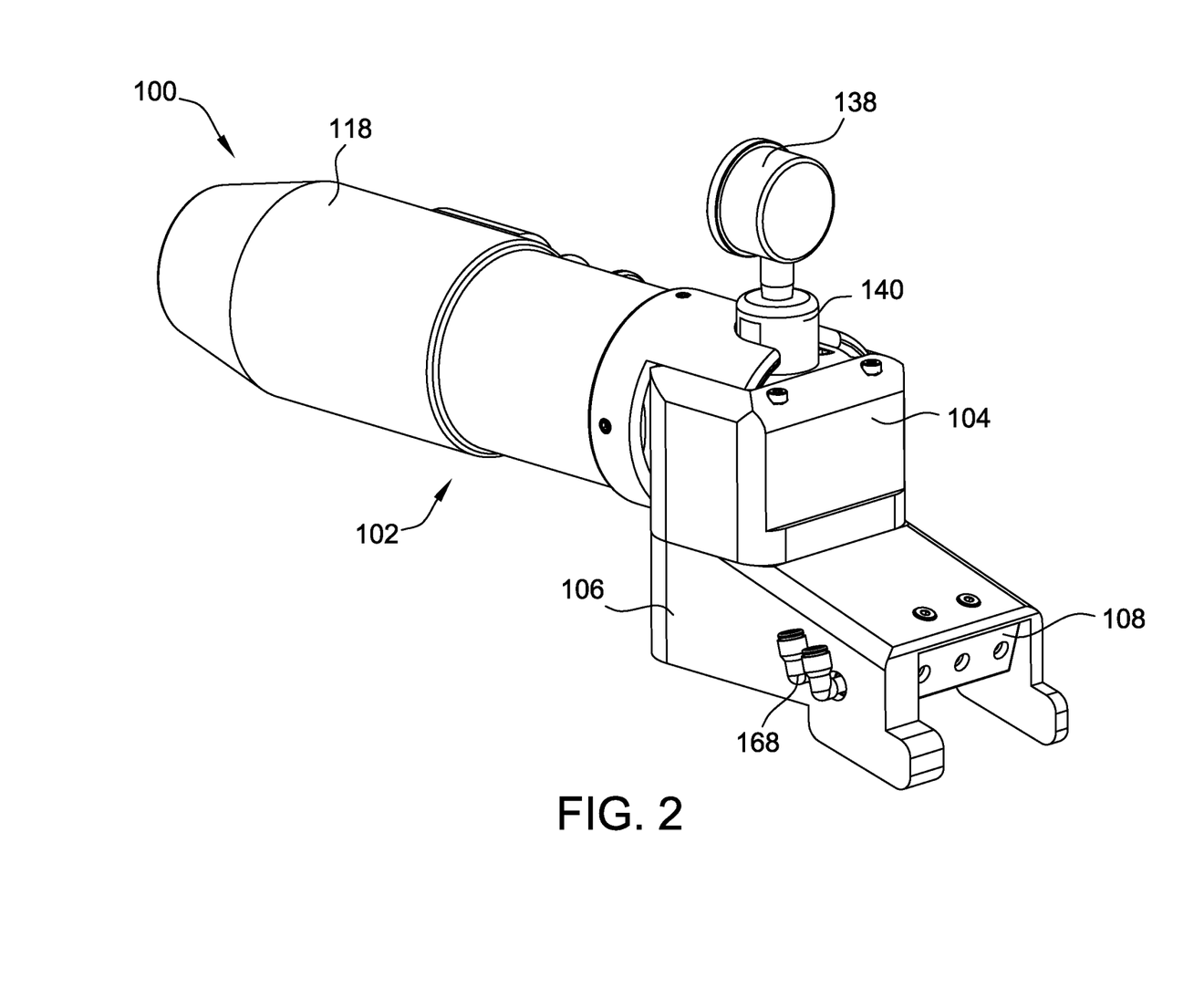
FIG. 2 is a perspective view of an exemplary fluid fill tool that may be used with the fluid fill system shown in FIG. 1.
Figure 3:
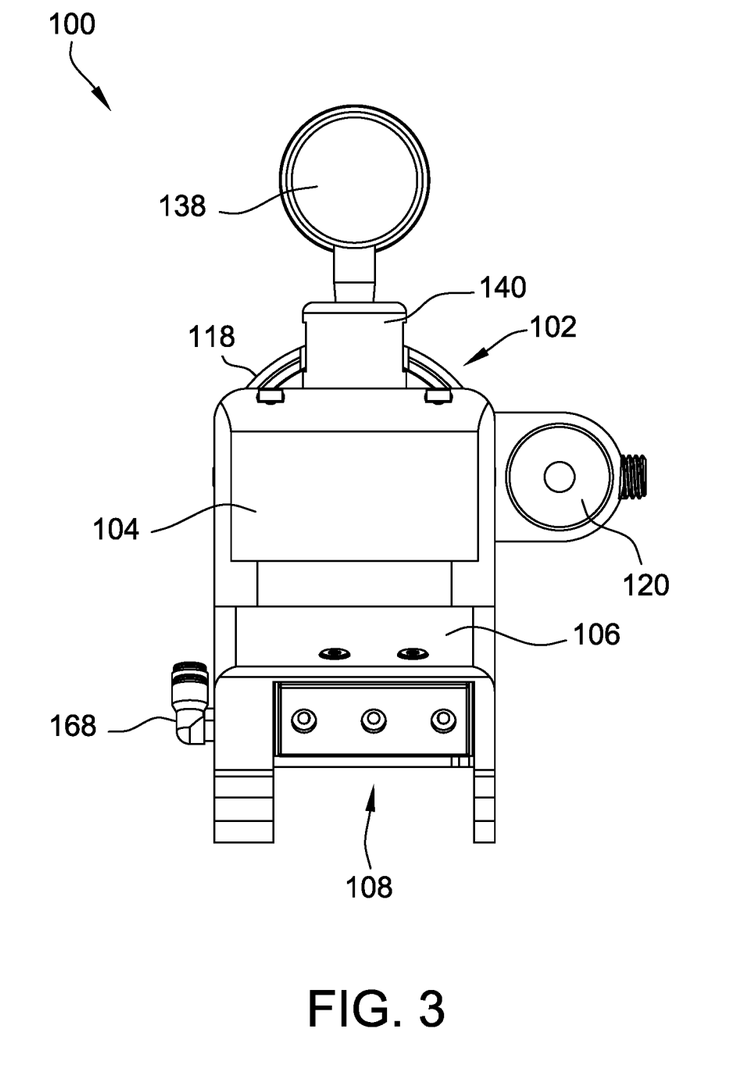
FIG. 3 is a front view of the fluid fill tool shown in FIG. 2.

FIG. 2 is a perspective view of an exemplary fluid fill tool 100, and FIG. 3 is a front view of fluid fill tool 100. In the exemplary embodiment, fluid fill tool 100 channels fluid from storage tank 12 to a fluid reservoir 202 of a vehicle 200. In the exemplary embodiment, fluid fill tool 100 includes a valve assembly 102, a main body 104, a housing 106, and a support mechanism 108. Main body 104 is coupled between valve assembly 102 and housing 106, and support mechanism 108 is coupled to housing 106. In the exemplary embodiment, fluid fill tool 100 also includes a cylindrical cover 118.

Figure 4:
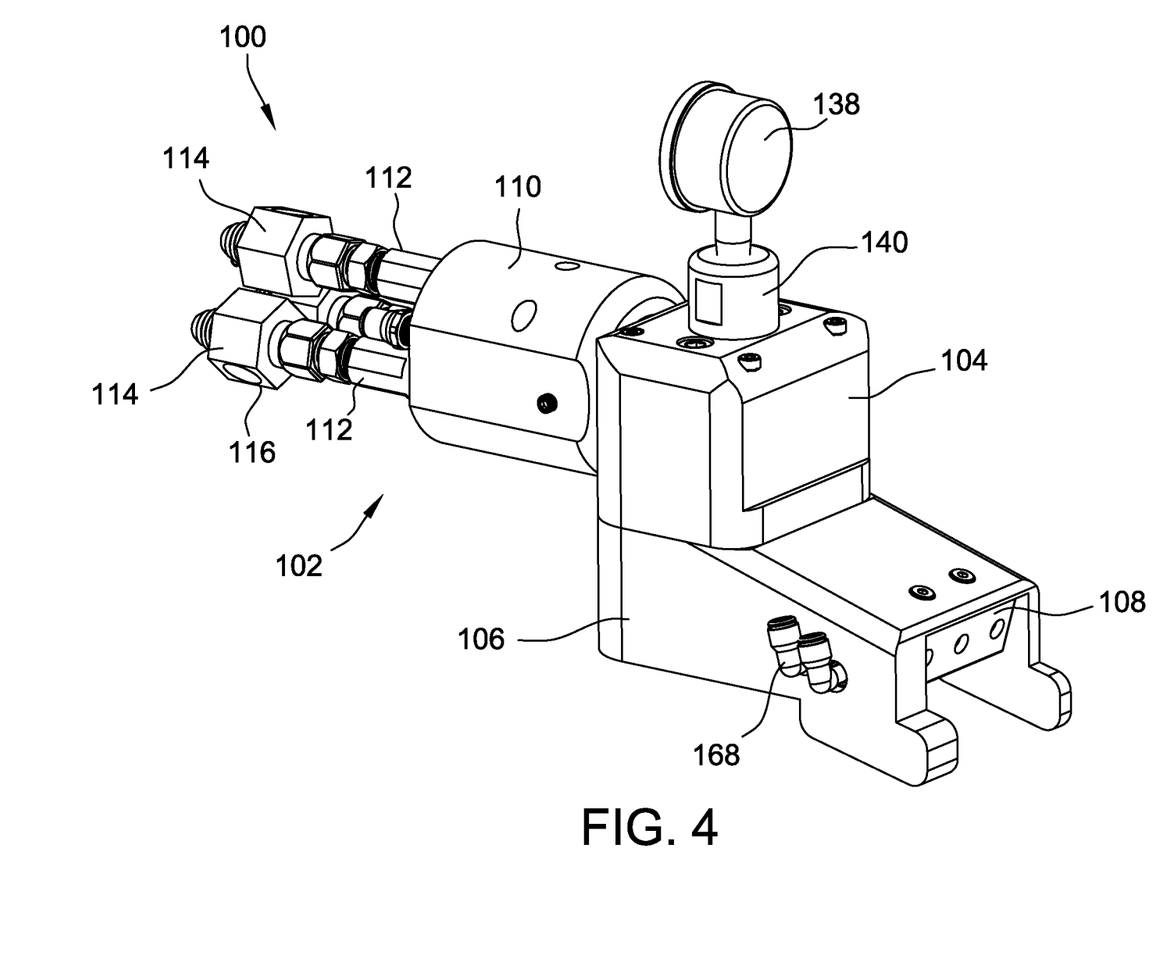
FIG. 4 is a perspective view of the fluid fill tool shown in FIG. 2 and including a portion of a valve assembly.
Figure 5:
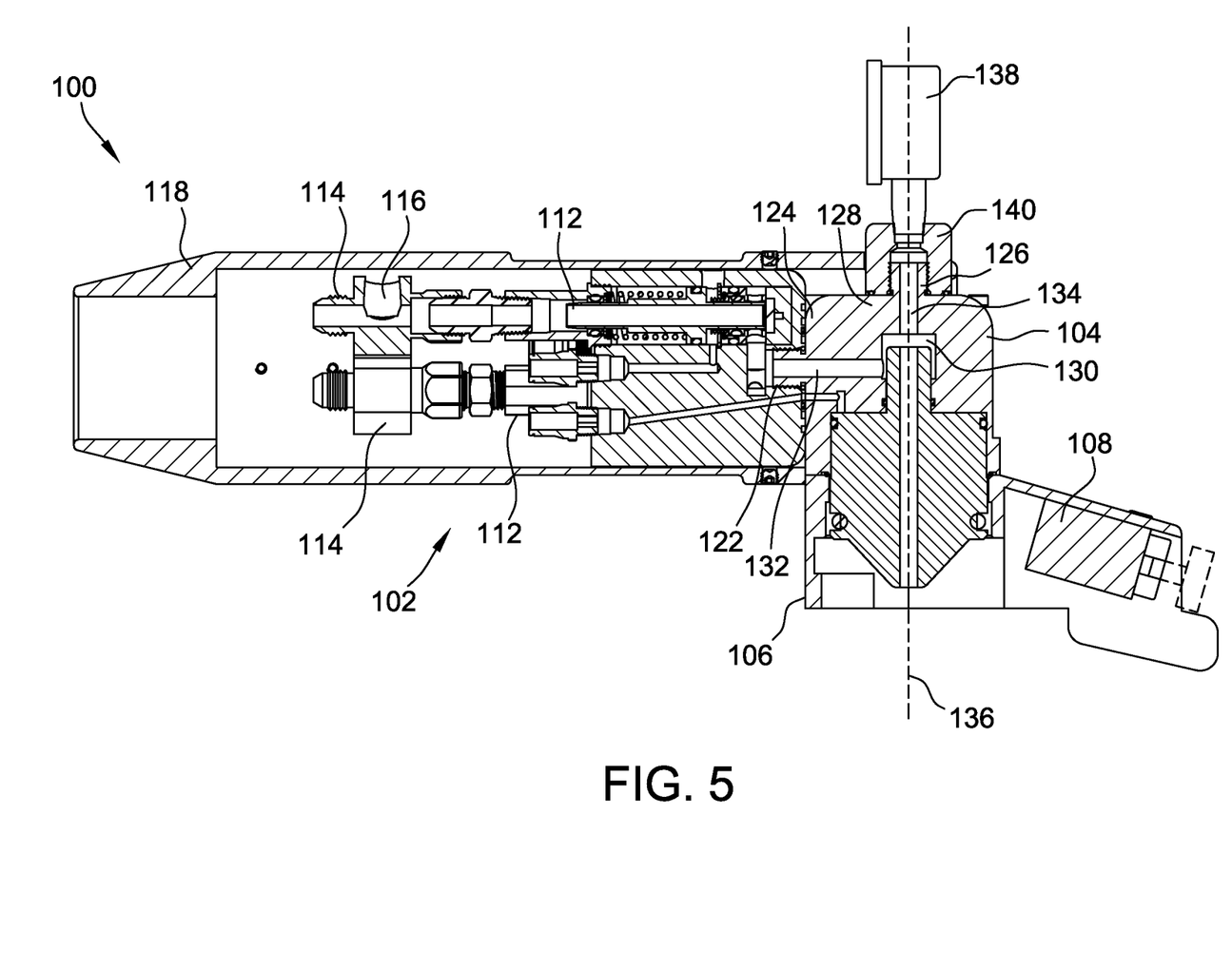
FIG. 5 is a cross-sectional side view of the fluid fill tool shown in FIG. 2.

FIG. 4 is a perspective view of fluid fill tool 100 with cylindrical cover 118 removed to show components of valve assembly 102. FIG. 5 is a cross-sectional side view of fluid fill tool 100. As shown in FIGS. 4 and 5, valve assembly 102 includes a valve head 110 coupled to main body 104 and a plurality of fluid lines 112 coupled to valve head 110 and coupled in flow communication with main body 104. In the exemplary embodiment, valve assembly 102 includes three fluid lines 112; one each for supplying fluid, removing fluid, and channeling air. In other embodiments, valve assembly 102 includes any number of fluid lines 112 for channeling any fluid therethrough to facilitate operation of fluid fill tool 100 as described herein. Valve assembly 102 also includes a plurality of threaded couplings 114 coupled to fluid lines 112. More specifically, each fluid line 112 includes a threaded coupling 114 coupled thereto. A transducer 116 is coupled to each coupling 114 to measure a parameter of the fluid being channeled through the respective fluid line 112. In the exemplary embodiment, transducers 116 measure one of fluid supply pressure, vacuum pressure, and fluid scavenge pressure within fluid lines 112 at a location within valve assembly 102. As such, a technician is able to determine an amount of fluid being channeled through fluid lines 112 at a location that is near the fluid reservoir 202 on the vehicle 200. The parameters measured by transducers 116 within valve assembly 102 can be compared to the same parameters measured at a different location, such as proximate the fluid storage tank 12, to determine any differences between the locations.

In the exemplary embodiment, cylindrical cover 118 is coupled about valve head 110 and fluid lines 112 such that cover 118 circumscribes valve head 110, fluid lines 112, couplings 114, and transducers 116. Furthermore, cover 118 is also coupled to main body 104. A trigger device 120 extends from cover 118 and is manipulated by a technician to control a clamping mechanism 145 (shown as a bottom conical portion 145 of a nozzle 144 with an O-ring in FIG. 7) and support mechanism 108 to secure fluid fill tool 100 to the vehicle.

Figure 6:
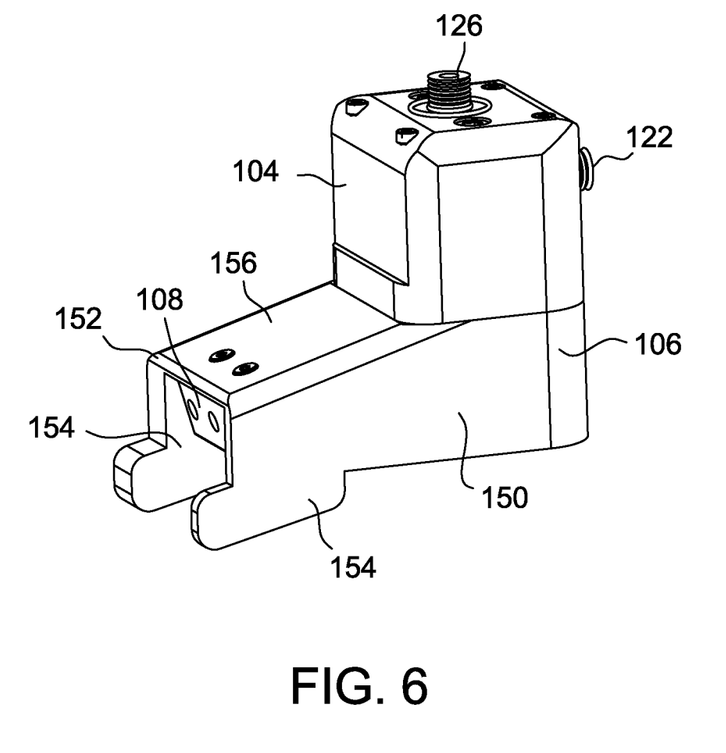
FIG. 6 is a perspective view of an exemplary main body and an exemplary housing of the fluid fill tool shown in FIG. 2.
Figure 7:
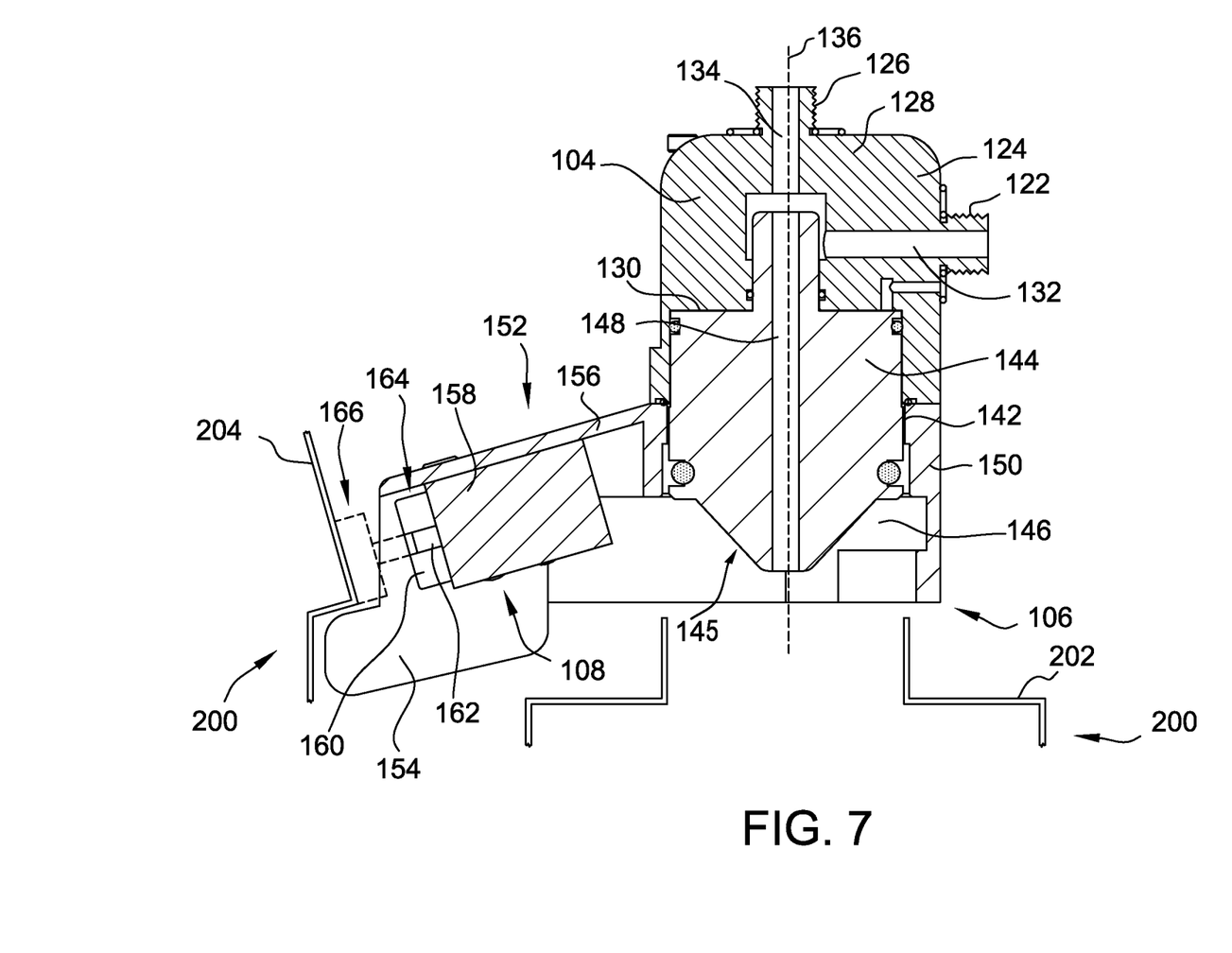
FIG. 7 is a cross-sectional view of the main body and the housing shown in FIG. 6.

As described above, FIG. 5 is a cross-sectional side view of fluid fill tool 100. FIG. 6 is a perspective view of main body 104 and housing 106, and FIG. 7 is a cross-sectional view of main body 104 and housing 106. In the exemplary embodiment, main body 104 includes a first connector 122 extending from a first wall 124 and a second connector 126 extending from a second wall 128. Walls 124 and 128 at least partially define a fluid cavity 130 within main body 102. A first passageway 132 couples first connector 122 in flow communication with cavity 130, and a second passageway 134 couples second connector 126 in flow communication with cavity 130. As best shown in FIGS. 5 and 7, first wall 124 is oriented perpendicular to second wall 128 and first connector 122 is oriented perpendicular to second connector 126.

In the exemplary embodiment, valve assembly 102, and more specifically, valve head 310, is selectively coupled to one of first connector 122 or second connector 126 to couple fluid lines 112 in flow communication with cavity 130 through one of connectors 122 or 126. In the configuration shown in FIGS. 2-5, valve assembly 102 is coupled to first connector 122. In other embodiments, valve assembly 102 is coupled to second connector 126. More specifically, valve assembly 102 is removably coupled to one of first or second connectors 122 or 126 such that the valve assembly 102 can be removed from, for example, first connector 122 and subsequently coupled to second connector 126. In configurations where valve assembly 102 is coupled to first connector 122, valve assembly is oriented perpendicular to an axis 136 extending through cavity 130. Alternatively, in configurations where valve assembly 102 is coupled to second connector 126, valve assembly is oriented parallel to axis 136 extending through cavity 130.

Fluid fill tool 100 also includes a gauge or measuring device 138 removably coupled to the remaining one of first connector 122 or second connector 126 that is not connected to valve assembly 102. More specifically, a collar 140 is coupled about the first or second connector 122 or 126 and measuring device 138 is coupled to collar 140 and to the first or second connector 122 or 126. In the exemplary embodiment, measuring device 138 measures a pressure of the fluid within cavity 130. Alternatively, measuring device 138 measures any parameter of the fluid that facilitates operation of fluid fill tool 100 as described herein.

Referring to FIGS. 6 and 7, in the exemplary embodiment, housing 106 includes an opening 142 defined therethrough that is in flow communication with openings 132 and 134 of main body 104. Fluid fill tool 100 also includes a nozzle 144 that extends at least partially though opening 142. More specifically, housing 106 defines a cavity 146 that is aligned with opening 142 and cavity 130 of main body 104 such that nozzle 144 is positioned within both cavities 130 and 146. Nozzle 144 includes a channel 148 defined therethrough that couples passageways 132 and 134 in flow communication with a fluid reservoir 202 of a vehicle 200. As such, fluid is able to flow through fluid lines 112 (shown in FIG. 5), into passageway 132 or 134, based on which connector 122 or 126 valve assembly 102 is coupled to, through channel 148 of nozzle 144, and into fluid reservoir 202.

In the exemplary embodiment, housing 106 includes a body portion 150 coupled to main body 104 and an extension portion 152 that extends from body portion 150 in a direction away from nozzle 144 and second connector 126. Body portion 150 includes opening 142 and defines cavity 146, while extension portion 152 is positioned proximate a body panel or wall 204 of vehicle 200. More specifically, extension portion 152 includes a pair of parallel sidewalls 154 and an extension plate 156 extending therebetween. In the exemplary embodiment, support mechanism 108 is coupled to extension portion 152 of housing 106, and more specifically, support mechanism 108 is coupled between sidewalls 154 and to extension plate 156.

As best shown in FIG. 7, support mechanism 108 includes a body portion 158 and a moveable support plate 160. Body portion 158 is coupled between sidewalls 154 of extension portion 152 and support plate 160 is coupled to body portion 158 via at least one pneumatic actuator arm 162. In the exemplary embodiment, support mechanism 108, and, more specifically, support plate 160, is selectively moveable between a first position 164 and a second position 166 (shown in hidden lines in FIG. 7). In the first position 164, support plate 160 is retracted into extension portion 152 such that support plate 160 is spaced away from a wall 204 of vehicle 200. In the second position 166, actuator arm 162 extends from body portion 158 and moves support plate 160 outward such that support plate 160 contacts vehicle wall 204.

Support mechanism 108 provides a second point of contact for fluid fill tool 100 besides at reservoir 202 to support fluid fill tool 100 and to restrict or reduce movement of fluid fill tool 100 and reservoir 202 during operation. More specifically, manipulation of trigger device 120 (shown in FIG. 3) controls operation of a clamping mechanism 145 of fluid fill tool 100 to clamp tool 100 to reservoir 202 and also controls operation of support mechanism 108 to selectively move support plate 160 between first position 164 and second position 166 to lock fluid fill tool 100 with respect to vehicle wall 204. In the exemplary embodiment, actuator arm 162 is pneumatically driven by channeling a fluid through a pair of connectors 168 (shown in FIGS. 2-4) to support mechanism 108. Alternatively, support plate 160 may be moveable between first position 164 and second position 166 by any actuation means that facilitates operation of fluid fill tool 100 as described herein.

In operation, fluid fill tool 100 not only clamps to the vehicle reservoir 202 using the clamping mechanism 145, but support plate 160 locks fluid fill tool 100 to vehicle body 204 in the second position 166 and prevents or reduces the movement of fluid fill tool 100 while reservoir 202 is being filled. More specifically, support plate 160 transfers at least some of the weight of fluid fill tool 100 to vehicle body 204 and provides an anchor point to balance the weight of valve assembly 102. Securing the fluid fill tool 100 to the vehicle wall 204 with the support plate 160 prevents forces that may be applied to fluid fill tool 100 during filling (e.g., the weight of the tool 100, inadvertent bumping of the tool 100 by an operator) from breaking the seal between the fluid fill tool and the vehicle reservoir.

The fluid fill system described herein includes sensors located at the fluid fill tool to accurately measure the parameters of the fluid as it is channeled into the vehicle. Also, the fluid fill tool described herein includes a support mechanism that is moveable to selectively move the tool in position against a wall of the vehicle to restrict movement of the reservoir. Finally, the fluid fill tool described herein includes a removable valve assembly that can be coupled to a main body of the tool to change the orientation of the valve assembly such that a single selectively configurable tool can replace multiple single configuration tools.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid fill tool for filling a reservoir on a vehicle, said fluid fill tool comprising:
   a main body defining a cavity therein;
   a housing coupled to said main body and defining an opening therethrough, wherein said opening is coupled in fluid communication with said cavity;
   a nozzle coupled to said main body and extending at least partially through said opening, said nozzle in fluid communication with said cavity and configured to supply fluid to the reservoir via a reservoir inlet;
   a support mechanism coupled to said housing, wherein said support mechanism is selectively moveable between a first position and a second position; and
   a trigger device operatively coupled to said support mechanism, wherein activation of said trigger device causes a clamp to secure said fluid fill tool to the reservoir and said support mechanism to move between the first position and the second position to contact a wall of the vehicle at a location spaced from the reservoir inlet to reduce movement of the reservoir.

2. The fluid fill tool in accordance with claim 1, wherein said housing comprises an extension portion extending from said housing in a direction away from said opening, and wherein said support mechanism is coupled to said extension portion.

3. The fluid fill tool in accordance with claim 2, wherein said extension portion comprises a pair of parallel sidewalls, and wherein said support mechanism is coupled between said pair of sidewalls.

4. The fluid fill tool in accordance with claim 2, wherein said support mechanism comprises:
   a body portion coupled to said extension portion; and
   a support plate coupled to said body portion, wherein said support plate is moveable between said first position and said second position.

5. The fluid fill tool in accordance with claim 1 wherein said support mechanism comprises:
   a body portion coupled to said housing; and
   a support plate coupled to said body portion, wherein said support plate is moveable between said first position and said second position.

6. The fluid fill tool in accordance with claim 5, wherein said support plate is spaced from the vehicle wall in the first position, and wherein said support plate contacts the vehicle wall in the second position.

7. The fluid fill tool in accordance with claim 1, wherein said support mechanism is pneumatic.

8. The fluid fill tool in accordance with claim 1, further comprising a valve assembly coupled to said main body, said valve assembly comprising a plurality of fluid lines and a threaded coupling coupled to at least one of said plurality of fluid lines.

9. The fluid fill tool in accordance with claim 8, wherein said valve assembly comprises a transducer coupled to said threaded coupling, said transducer configured to measure at least one of a brake fluid pressure, a vacuum pressure, and a scavenge pressure within said valve assembly.

10. The fluid fill tool in accordance with claim 8, wherein said main body comprises a first connector and a second connector, wherein said cavity is coupled in flow communication with both said first connector and said second connector; and wherein said valve assembly is selectively coupled to one of said first connector or said second connector to couple said fluid lines in flow communication with said cavity through one of said first connector and said second connector.

11. The fluid fill tool in accordance with claim 10, wherein said first connector is oriented perpendicularly to said second connector.

12. The fluid fill tool in accordance with claim 10, further comprising a measuring device coupled to the remaining one of said first connector or said second connector.

13. A method of using a fluid fill tool to fill a vehicle reservoir with a fluid, said method comprising:
   providing a main body including a fluid cavity defined therein;
   coupling a housing to the main body such that an opening defined in the housing is coupled in flow communication with the fluid cavity;
   coupling a nozzle to the main body, the nozzle extending at least partially through said opening and in fluid communication with said cavity;
   coupling a support mechanism to the housing;
   operatively coupling a trigger device to the support mechanism;
   positioning the nozzle adjacent to a reservoir inlet of the vehicle reservoir; and
   activating the trigger device, wherein activation of the trigger device causes a clamp to secure the fluid fill tool to the reservoir and the support mechanism to selectively move between a first position and a second position to selectively contact a wall of the vehicle at a location spaced from the reservoir inlet, wherein the support mechanism is coupled to the housing and is spaced away from the wall in the first position and contacts the wall in the second position.

14. The method in accordance with claim 13, wherein coupling the support mechanism to the housing comprises coupling the support mechanism to an extension portion of the housing that extends from the housing in a direction away from the opening.

15. The method in accordance with claim 14, wherein coupling the support mechanism to the extension portion comprises coupling the support mechanism between a pair of parallel sidewalls of the extension portion.

16. The method in accordance with claim 14, wherein coupling the support mechanism to the extension portion comprises coupling a body portion of the support mechanism to the extension portion and coupling a support plate to the body portion, wherein the support plate is moveable between the first and second positions.

17. The method in accordance with claim 16, further comprising extending the support plate from the first position to the second position in a direction away from the body portion to contact the vehicle wall such that the support mechanism secures the fluid fill tool to the vehicle.

18. The method in accordance with claim 13, wherein coupling the support mechanism to the housing comprises coupling a body portion of the support mechanism to the housing and coupling a support plate to the body portion, wherein the support plate is moveable between the first and second positions.

19. The method in accordance with claim 13, wherein providing the main body comprises providing the main body with a first connector and a second connector that are both coupled in flow communication with the cavity, said method further comprising:
   selectively coupling a valve assembly to one of the first connector or the second connector;
   channeling the fluid through at least one of a plurality of fluid lines of the valve assembly;
   channeling the fluid through the selected first connector or second connector into the fluid cavity; and
   channeling the fluid from the fluid cavity into the vehicle reservoir.

20. The method in accordance with claim 19, wherein providing the main body comprises providing the main body including the first connector being oriented perpendicular to the second connector.

* * * * *